US012762909B2

(12) United States Patent
Ahmad et al.

(10) Patent No.: US 12,762,909 B2
(45) Date of Patent: Oct. 13, 2026

(54) VEHICLE REPAIR SYSTEM

(71) Applicant: Ford Global Technologies, LLC, Dearborn, MI (US)

(72) Inventors: Syed Amaar Ahmad, Canton, MI (US); Saed M. Abuzahrieh, Rochester Hills, MI (US); Khalid Nayaz Ahmed, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 19/036,511

(22) Filed: Jan. 24, 2025

(65) Prior Publication Data

US 2026/0220983 A1 Jul. 30, 2026

(51) Int. Cl.
*G07C 5/08* (2006.01)
*B60S 5/00* (2006.01)

(52) U.S. Cl.
CPC .............. *G07C 5/0808* (2013.01); *B60S 5/00* (2013.01)

(58) Field of Classification Search
CPC ................................ G07C 5/0808; B60S 5/00
See application file for complete search history.

(56) References Cited

U.S. PATENT DOCUMENTS

| | | | | |
|---|---|---|---|---|
| 6,529,808 | B1 * | 3/2003 | Diem | G01R 31/006 701/33.6 |
| 8,996,235 | B2 | 3/2015 | Singh et al. | |
| 9,530,255 | B2 * | 12/2016 | Drew | G07C 5/0825 |
| 10,423,934 | B1 | 9/2019 | Zanghi et al. | |
| 10,891,597 | B2 | 1/2021 | Lewis et al. | |
| 2010/0023203 | A1 | 1/2010 | Shibi | |
| 2011/0137711 | A1 * | 6/2011 | Singh | G07C 5/0808 705/305 |
| 2015/0012169 | A1 * | 1/2015 | Coard | G06Q 10/06316 705/305 |
| 2020/0160284 | A1 | 5/2020 | Abuelsaad et al. | |
| 2021/0072975 | A1 * | 3/2021 | Khafagy | G06F 8/654 |
| 2021/0090461 | A1 | 3/2021 | Cannarsa et al. | |
| 2023/0083255 | A1 | 3/2023 | Ebrahimi et al. | |
| 2026/0073743 | A1 * | 3/2026 | Pinnada | G06N 20/00 |

* cited by examiner

*Primary Examiner* — Kyle J Kingsland
(74) *Attorney, Agent, or Firm* — Christopher Storms; Brooks Kushman P.C.

(57) ABSTRACT

A computer includes a processor and a memory, and the memory stores instructions executable by the processor to generate a protocol to address a malfunction in a system of a vehicle based on an inputted description of the malfunction, determine that a deviation occurred based on data transmitted on board the vehicle, and, upon determining that the actual intervention deviated from the protocol, generate an output indicating the deviation. The protocol includes an ordered list of proposed interventions on the vehicle. The deviation is an actual intervention on the vehicle deviating from a respective one of the proposed interventions of the protocol. The data transmitted on board the vehicle identifies at least one component of the system.

14 Claims, 2 Drawing Sheets

VEHICLE REPAIR SYSTEM

BACKGROUND

Modern vehicles typically include on-board diagnostics, which are systems to self-diagnose and report issues on board a vehicle. Reporting issues may follow a standard such as On-Board Diagnostics II (OBD-II). The vehicle may output a message indicating an issue through a physical port. The OBD-II standard specifies a 16-pin D-shaped female connector as the port for outputting messages. The message may take the form of a diagnostic trouble code (DTC). According to OBD-II, the format of a DTC is a letter followed by four digits, the combination of which can identify a particular issue with the vehicle, such as a fault associated with a vehicle component.

DETAILED DESCRIPTION

Figure 1:
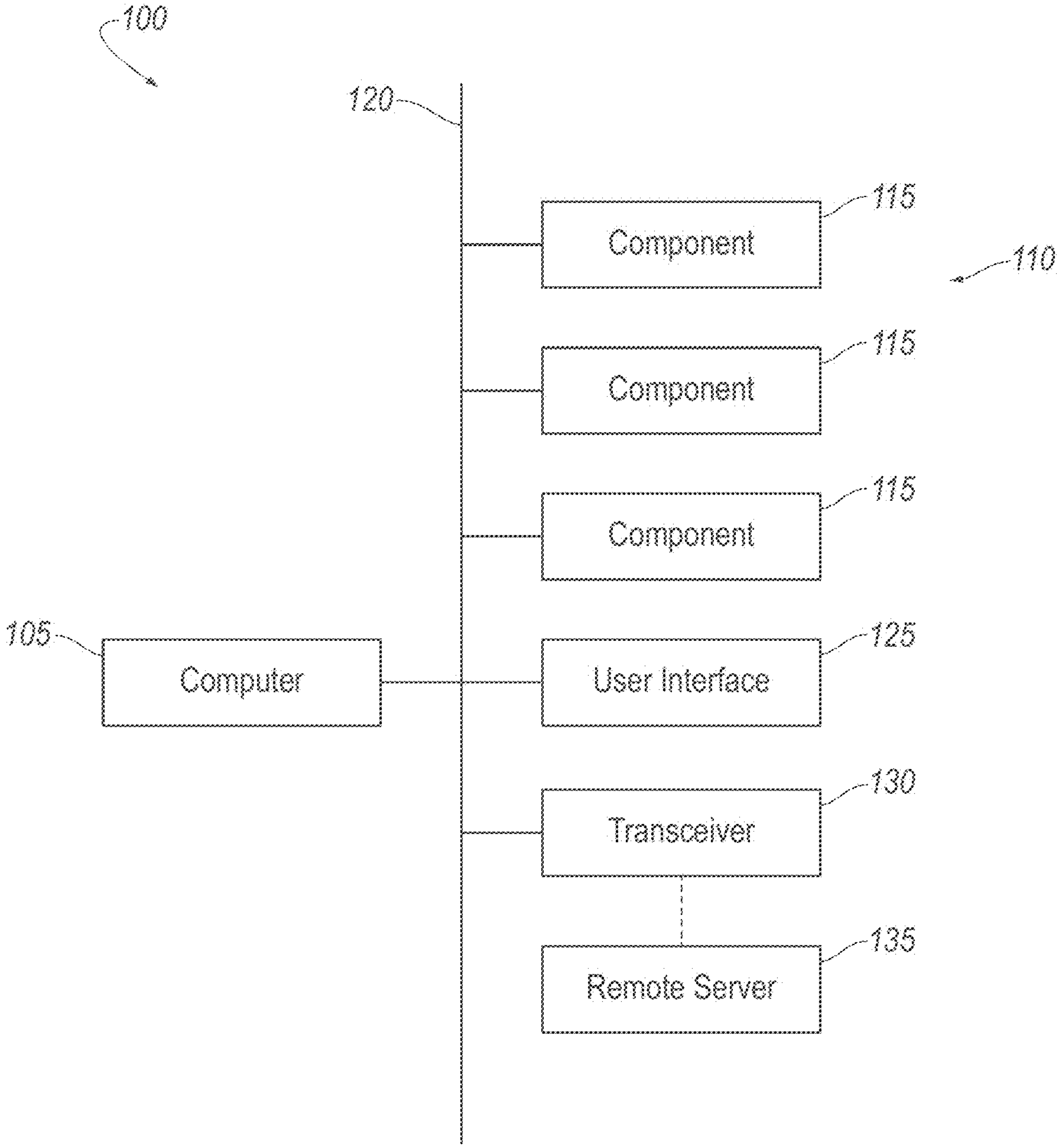
FIG. 1 is a block diagram of an example vehicle.

This disclosure describes techniques for repairing a malfunction of a vehicle. The system herein may help a technician efficiently perform the repair. A computer is programmed to, first, generate a protocol to address a malfunction in a system of a vehicle based on an inputted description of the malfunction. For example, the computer may execute a large-language model, to which is inputted a description provided by an operator of the vehicle and/or the technician, as well as on-board data from the vehicle. The protocol includes an ordered list of proposed interventions on the vehicle (e.g., first, performing a software update of an electronic control module of the vehicle; second, testing wired connections to the electronic control module; third, replacing the electronic control module). The computer is programmed to, next, determine that a deviation occurred based on data transmitted on board the vehicle. The deviation is an actual intervention on the vehicle deviating from a respective one of the proposed interventions of the protocol (e.g., replacing the electronic control module before performing the software update). The data transmitted on board the vehicle identifies at least one component of the system. For example, an identifier of the electronic control module may be different, indicating that the electronic control module was replaced (i.e., the actual intervention) before the software of the electronic control module was updated or the wired connections of the electronic control module were tested (i.e., the proposed intervention). The computer is programmed to, finally, upon determining that the actual intervention deviated from the protocol, generate an output indicating the deviation. As a result, this system can change the physical outcome of the repair, such as by causing a software update or a wiring replacement instead of a replacement of the electronic control module.

A computer includes a processor and a memory, and the memory stores instructions executable by the processor to generate a protocol to address a malfunction in a system of a vehicle based on an inputted description of the malfunction, determine that a deviation occurred based on data transmitted on board the vehicle, and, upon determining that the actual intervention deviated from the protocol, generate an output indicating the deviation. The protocol includes an ordered list of proposed interventions on the vehicle. The deviation is an actual intervention on the vehicle deviating from a respective one of the proposed interventions of the protocol. The data transmitted on board the vehicle identifies at least one component of the system.

In an example, the data identifying the at least one component may include at least one identifying number of the at least one component.

In an example, the at least one component may include an electronic control module, and the protocol may include updating software on the electronic control module before replacing the electronic control module. In a further example, the electronic control module may be an original electronic control module, and the deviation may be replacing the original electronic control module with a replacement electronic control module without updating the software on the original electronic control module. In a still further example, the instructions to determine that the deviation occurred may include instructions to determine that an identifier of the replacement electronic control module transmitted on board the vehicle is different than an identifier of the original electronic control module.

In an example, the at least one component may include an electronic control module, and the protocol may include checking wired connections to the electronic control module before replacing the electronic control module.

In an example, the instructions to generate the protocol may include instructions to execute a large-language model with a retrieval-augmented generator. In a further example, the inputted description may include unstructured text.

In another further example, the inputted description may include a diagnostic trouble code transmitted on board the vehicle.

In another further example, the large-language model may be trained on training data including service manuals.

In another further example, the large-language model may be trained on training data including descriptions of earlier malfunctions.

In an example, the instructions may further include instructions to display the output indicating the deviation on a user interface of the vehicle.

In an example, the instructions may further include instructions to, upon determining that the actual intervention deviated from the protocol, transmit a message indicating the deviation to a server remote from the vehicle. In a further example, the message may include a log of actual interventions on the vehicle.

A method includes generating a protocol to address a malfunction in a system of a vehicle based on an inputted description of the malfunction, determining that a deviation occurred based on data transmitted on board the vehicle, and, upon determining that the actual intervention deviated from the protocol, generating an output indicating the deviation. The protocol includes an ordered list of proposed interventions on the vehicle. The deviation is an actual intervention on the vehicle deviating from a respective one of the proposed interventions of the protocol. The data transmitted on board the vehicle identifies at least one component of the system.

In an example, the data identifying the at least one component may include at least one of a part number or serial number of the at least one component.

In an example, the at least one component may include an electronic control module, and the protocol includes updating software on the electronic control module before replacing the electronic control module. In a further example, the electronic control module may be an original electronic control module, and the deviation may be replacing the original electronic control module with a replacement electronic control module without updating the software on the original electronic control module. In a yet further example, determining that the deviation occurred may include determining that an identifier of the replacement electronic control module transmitted on board the vehicle is different than an identifier of the original electronic control module.

In an example, generating the protocol may include executing a large-language model with a retrieval-augmented generator.

With reference to the Figures, wherein like numerals indicate like parts throughout the several views, a computer 105 includes a processor and a memory, and the memory stores instructions executable by the processor to generate a protocol to address a malfunction in a system 110 of a vehicle 100 based on an inputted description of the malfunction, determine that a deviation occurred based on data transmitted on board the vehicle 100, and, upon determining that the actual intervention deviated from the protocol, generate an output indicating the deviation. The protocol includes an ordered list of proposed interventions on the vehicle 100. The deviation is an actual intervention on the vehicle 100 deviating from a respective one of the proposed interventions of the protocol. The data transmitted on board the vehicle 100 identifies at least one component 115 of the system 110.

With reference to FIG. 1, the vehicle 100 may be any passenger or commercial automobile such as a car, a truck, a sport utility vehicle, a crossover, a van, a minivan, a taxi, a bus, etc. The vehicle 100 may include the computer 105, a communications network 120, a plurality of systems 110 made up of components 115, a user interface 125, and a transceiver 130.

The computer 105 is a microprocessor-based computing device such as a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming (e.g., stored in a memory electrically connected to the FPGA circuit). The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 120. The communications network 120 may be a controller area network (CAN) bus, Ethernet, WiFi, Local Interconnect Network (LIN), onboard diagnostics connector (OBD-II), and/or any other wired or wireless communications network. The computer 105 may be communicatively coupled to the components 115, the user interface 125, and the transceiver 130 via the communications network 120.

The vehicle 100 includes a plurality of components 115. The components 115 are configured to perform tasks to facilitate operation of the vehicle 100. For example, the components 115 may include sensors, actuators, electronic control modules, wiring (all described below in turn), and other types.

The sensors may provide data about operation of the vehicle 100, for example, wheel speed, wheel orientation, and engine and transmission data (e.g., temperature, fuel consumption, etc.). The sensors may detect the location and/or orientation of the vehicle 100. For example, the sensors may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors may detect the external world, including objects and/or characteristics of surroundings of the vehicle 100, such as other vehicles, road lane markings, traffic lights and/or signs, road users, etc. For example, the sensors may include radar sensors, ultrasonic sensors, scanning laser range finders, light detection and ranging (lidar) devices, and image processing sensors such as cameras.

The actuators are components 115 that actuate when commanded. In the context of the present disclosure, "actuating" is defined as setting an object into motion via a mechanical or electromechanical stimulus. For example, the actuators may include throttle, electric power-assisted steering (EPAS) motors, washer fluid pumps, windshield wiper motors, climate-control fans, etc.

Each electronic control module is a microprocessor-based computing device such as a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming (e.g., stored in a memory electrically connected to the FPGA circuit). Each electronic control module can thus include a processor, a memory, etc. The memory of the electronic control module can include media for storing instructions executable by the processor as well as for electronically storing data and/or databases, and/or the electronic control module can include structures such as the foregoing by which programming is provided. Each electronic control module is a separately packaged unit.

The wiring interconnects other components 115 of the vehicle 100, such as the sensors, actuators, and electronic control modules. For example, the wiring may communicatively couple components 115 (e.g., as part of the communications network 120). For another example, the wiring may provide electrical connections to provide energy for operating the components 115 (e.g., from a battery or the like).

The components 115 are connected together to form systems 110 of the vehicle 100. A system 110 is a set of components 115 working together to perform a task. For example, a camera, an electronic control module, and wiring connecting the camera and the electronic control module may form a system 110 for analyzing visual data.

The user interface 125 presents information to and receives information from an operator of the vehicle 100. The user interface 125 may be located on an instrument panel in a passenger compartment of the vehicle 100, and/or wherever may be readily seen by the operator. The user interface 125 may include dials, digital readouts, screens, speakers, and so on for providing information to the operator, such as human-machine interface (HMI) elements such as are known. The user interface 125 may include buttons, knobs, keypads, microphone, and so on for receiving information from the operator.

The transceiver 130 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 130 may be adapted to communicate with a remote server 135, that is, a server distinct and spaced from the vehicle 100. The remote server 135 may be located outside the vehicle 100. For example, the remote server 135 may be associated with another vehicle (e.g., V2V communications), an infrastructure component (e.g., V2I communications), a first responder, a mobile device associated with the operator of the vehicle 100, etc. In particular, the remote server 135 may be associated with a manufacturer of the vehicle 100. The transceiver 130 may be one device or may include a separate transmitter and receiver.

Techniques are described below for addressing malfunctions in components 115 of the vehicle 100. For the purposes of this disclosure, a "malfunction" is defined as a task being performed improperly by the components 115. For example, a malfunction may be that image data from a camera is not displaying on a screen of the user interface 125. Because tasks can be performed by components 115 working together in a system 110, a technician may not know in advance which component 115 is causing a malfunction or what the cause of the malfunction is. For example, possible causes of the image data not displaying may include damage to the camera, a loose wiring connection between the camera and an electronic control module, damage to the wiring connection, a software issue in the electronic control module that processes the data from the camera, etc.

To address a malfunction, a technician performs one or more interventions to the vehicle 100. For the purposes of this disclosure, an "intervention" is defined as an inspection of or a change to software or hardware of the vehicle 100. The interventions may be chosen to address possible causes of the malfunction. For example, interventions to address image data from a camera not displaying on a screen may include replacing the camera, adjusting or replacing a part of the camera, reconnecting the wiring, replacing the wiring, updating software on the electronic control module (e.g., drivers for the camera), replacing the electronic control module, etc.

The computer 105 may be programmed to transition the vehicle 100 into a repair mode upon receiving an input from a technician. During typical operation, the vehicle 100 may be in a nonrepair mode. When the vehicle 100 is in the repair mode, certain data and commands may be outputted or otherwise available to the technician (e.g., via the user interface 125 or an OBD-II port) that are not available in the nonrepair mode. For example, the protocol described below may be outputted only when the vehicle 100 is in the repair mode. The input provided by the technician may indicate that the inputter is a technician, such as login information identifying the technician. The technician may provide the input via the user interface 125 and/or the OBD-II port.

The protocol may be available for the technician to follow when performing interventions to address a malfunction in a system 110 of the vehicle 100. The protocol includes an ordered list of proposed interventions on the vehicle 100 (e.g., on the components 115 of the system 110 of the vehicle 100). The interventions are "proposed" in that the technician has not necessarily performed the interventions yet. The protocol is specific to the malfunction or type of malfunction. In other words, a different malfunction or different type of malfunction will result in a different protocol. The ordering of the proposed interventions represents a sequence in which the technician should perform the proposed interventions. For example, the protocol may include the following for addressing image data not displaying on a screen: {(1) check cleanliness of camera lens, and if covered, clean off or defrost; (2) check software version for camera drivers on the electronic control module that controls the camera, and if the software version is not current, perform a software update; (3) check for loose connections on the wiring connecting the camera and the electronic control module, and tighten the connections if loose; (4) check for damage to the wiring, and replace if damaged; (5) check for damage to the camera, repair if damaged and repairable, replace if damaged and not repairable; (6) check for damage to the electronic control module, and replace if damaged}.

The computer 105 is programmed to generate the protocol. The computer 105 generates the protocol based on an inputted description of the malfunction, which may include a natural-language description of the malfunction and/or data transmitted on board the vehicle 100 (e.g., over the communications network 120). For example, the computer 105 may be programmed to execute a large-language model (LLM) with a retrieval-augmented generator (RAG). The term "large-language model" is used in its machine-learning sense of a computational model for natural language processing tasks. The LLM takes as input the indication of the malfunction, and the LLM provides as output the protocol. A RAG modifies interactions with an LLM so that the LLM responds to prompts with reference to a specified set of reference documents.

The computer 105 may generate the protocol based on the inputted description of the malfunction. The inputted description may include unstructured text (e.g., a natural language description of the malfunction). The unstructured text may be provided by the technician and/or the operator of the vehicle 100. The technician or operator may type the unstructured text or may record the unstructured text and apply a speech-to-text conversion. The computer 105 may perform the speech-to-text conversion on audio data received via a microphone of the user interface 125. The unstructured text may be inputted via the user interface 125 once the vehicle 100 is in the repair mode. Alternatively or additionally, the inputted description may include data transmitted on board the vehicle 100, such as a diagnostic trouble code (DTC). According to OBD-II, the format of a DTC is a letter followed by four digits, the combination of which can identify a particular issue with the vehicle 100, such as a fault associated with a component 115. Alternatively or additionally, the inputted description may include one or more images of the components 115 of the system 110 experiencing the malfunction. The images may be captured by the technician using a camera on a separate mobile device and inputted via the transceiver 130.

The LLM may be trained on training data that includes technical documentation for the vehicle 100. The technical documentation includes service manuals, which are instructions for technicians about how to address issues with specific components 115. The technical documentation may further include descriptions of earlier malfunctions, for example, case notes submitted by other technicians when addressing other malfunctions with other vehicles. For example, the RAG of the LLM may use the technical documentation as the reference documents. The LLM may thus be trained to provide protocols consistent with the recommendations of the technical documentation. For example, the LLM may be a customized version of a preexisting foundation model. In other words, the LLM may be a foundation model that is already trained on a general-purpose corpus of text and that is then trained further on the technical documentation. The LLM may use any suitable foundation model as a base, for example, GPT, LLaMA, Claude, Gemini, Nemotron, etc.

The computer 105 may generate the protocol as the output of executing the LLM. As a result of the RAG, the protocols outputted by the LLM may conform to characteristics specified in the technical documentation. For example, the protocol may include updating software on the electronic control module before replacing the electronic control module. For another example, the protocol may include checking wired connections to the electronic control module before replacing the electronic control module. The protocols may thus permit the vehicle 100 to continue operating with the same electronic control module for a longer time in cases in which the electronic control module is not damaged.

The computer 105 is programmed to track data indicating actual interventions on the vehicle 100. The interventions are "actual" in that the technician has performed the interventions. The data may be data that is transmitted on board the vehicle 100 (e.g., over the communications network 120). The data may specify changes to software installed on the electronic control modules over time. For example, the data may include a history of software updates on the electronic control module (e.g., with timestamps and version numbers). The data may identify at least one component 115 of the system 110. For example, the data may include at least one identifying number of the at least one component 115 (e.g., part number, serial number, media access control (MAC) address, etc.). The use of the identifying number permits the computer 105 to determine whether a component 115 was replaced. The data may include ignition cycles of the vehicle 100 (i.e., turning the vehicle 100 off and then on again), which can reset DTCs in order to check whether the malfunction is resolved. Some actual interventions may be undetectable or difficult to detect, such as cleaning the camera lens. The technician may report to the computer 105 that such interventions occurred, the computer 105 may indirectly infer that defrosting occurred based on a temperature change, or the computer 105 may skip such interventions when detecting deviations below.

As actual interventions occur, the computer 105 may execute the LLM to output an updated protocol. As an input to the LLM, the computer 105 may receive a text description of the results of the actual intervention from the technician in the same manner as the unstructured text above. As a further input to the LLM, the computer 105 may receive the data indicating the actual interventions, as described above. The LLM may output an updated version of the protocol. The updated protocol may include an indication of the next proposed intervention. The updated protocol may further include a natural language description of how to perform the next proposed intervention.

As described below, the computer 105 may determine whether a deviation occurred. A deviation is an actual intervention on the vehicle 100 deviating from the protocol. The deviation may be that the actual intervention is not included in the protocol. Alternatively, the deviation may be that the actual intervention occurred before a proposed intervention that is earlier in the protocol than the actual intervention. For example, the deviation may be replacing the original electronic control module with a replacement electronic control module without updating the software on the original electronic control module, or the deviation may be replacing the original electronic control module with a replacement electronic control module without checking the wired connections to the original electronic control module. As one example, the protocol may include { . . . (2) check software version for camera drivers on the electronic control module that controls the camera, and if the software version is not current, perform a software update; . . . (6) check for damage to the electronic control module, and replace if damaged}, and the actual intervention may be replacing the original electronic control module with a replacement electronic control module before performing the software update of the camera drivers.

The computer 105 may be programmed to determine whether a deviation occurred based on the data transmitted on board the vehicle 100 (e.g., over the communications network 120). For example, the computer 105 may determine the actual intervention that occurred and then determine whether the actual intervention deviated from a next proposed intervention of the protocol. For example, the computer 105 may determine that the actual intervention that occurred was the replacement of the original electronic control module with a replacement electronic control module, by determining that an identifier of the replacement electronic control module transmitted on board the vehicle 100 is different than an identifier of the original electronic control module. If the next proposed intervention is something different than the replacement of the electronic control module (e.g., updating software, checking wired connections, etc.), then the computer 105 determines that a deviation occurred.

The computer 105 may be programmed to, upon determining that the actual intervention deviated from the protocol (i.e., that a deviation occurred), generate an output indicating the deviation. For example, the computer 105 may display the output indicating the deviation on the user interface 125. The output may include the actual intervention and the next proposed intervention. The technician may thereby be able to correct the deviation.

The computer 105 may be programmed to iteratively determine whether a deviation occurred as each actual intervention occurs. The computer 105 may start by comparing the first actual intervention to occur with the first listed proposed intervention in the protocol. In response to the actual intervention matching the respective proposed intervention, the computer 105 may proceed to the next proposed intervention in the protocol to compare with the next actual intervention to occur. In response to the actual intervention deviating from the respective proposed intervention, the computer 105 may then compare the same proposed intervention with the next actual intervention to occur.

The computer 105 may continue tracking the data transmitted on board the vehicle 100 and determining whether deviations occurred until either the malfunction is resolved or all the proposed interventions in the protocol have occurred. The computer 105 may determine that the malfunction is resolved in response to an input from the technician indicating that the malfunction is resolved or in response to a DTC not reoccurring after an ignition cycle reset the DTC.

The computer 105 may be programmed to compile a log of the actual interventions on the vehicle 100. The log may include the actual interventions along with the order and/or times at which the actual interventions occurred. The log may also include the data from which the actual intervention was determined (e.g., data transmitted on board the vehicle 100 such as the history of software updates, the data identifying the components 115, etc.). The computer 105 may generate an empty file for the log in response to the vehicle 100 entering the repair mode. Upon generating the empty log, the computer 105 may populate the log with the DTCs that are currently active on the vehicle 100 and identifying data for the components 115 of the system 110 experiencing the malfunction, thereby making the data available for tracking the deviations as described above. The computer 105 may then populate the file with the actual interventions and data transmitted on board the vehicle 100 as the actual interventions occur and as the data is transmitted. The log may be persistent across ignition cycles. In other words, the data is maintained in the log when the vehicle 100 is turned off and back on, rather than being cleared.

The computer 105 may be programmed to transmit a message indicating the deviation to the remote server 135. For example, the message may include the log. The message may further include text data entered by the technician (e.g., describing the results of the actual interventions as described above). The message may provide further training data for the LLM. The computer 105 may transmit the message via the transceiver 130 to the remote server 135. The computer 105 may transmit the message in response to the malfunction being addressed or the vehicle 100 exiting the repair mode.

Figure 2:
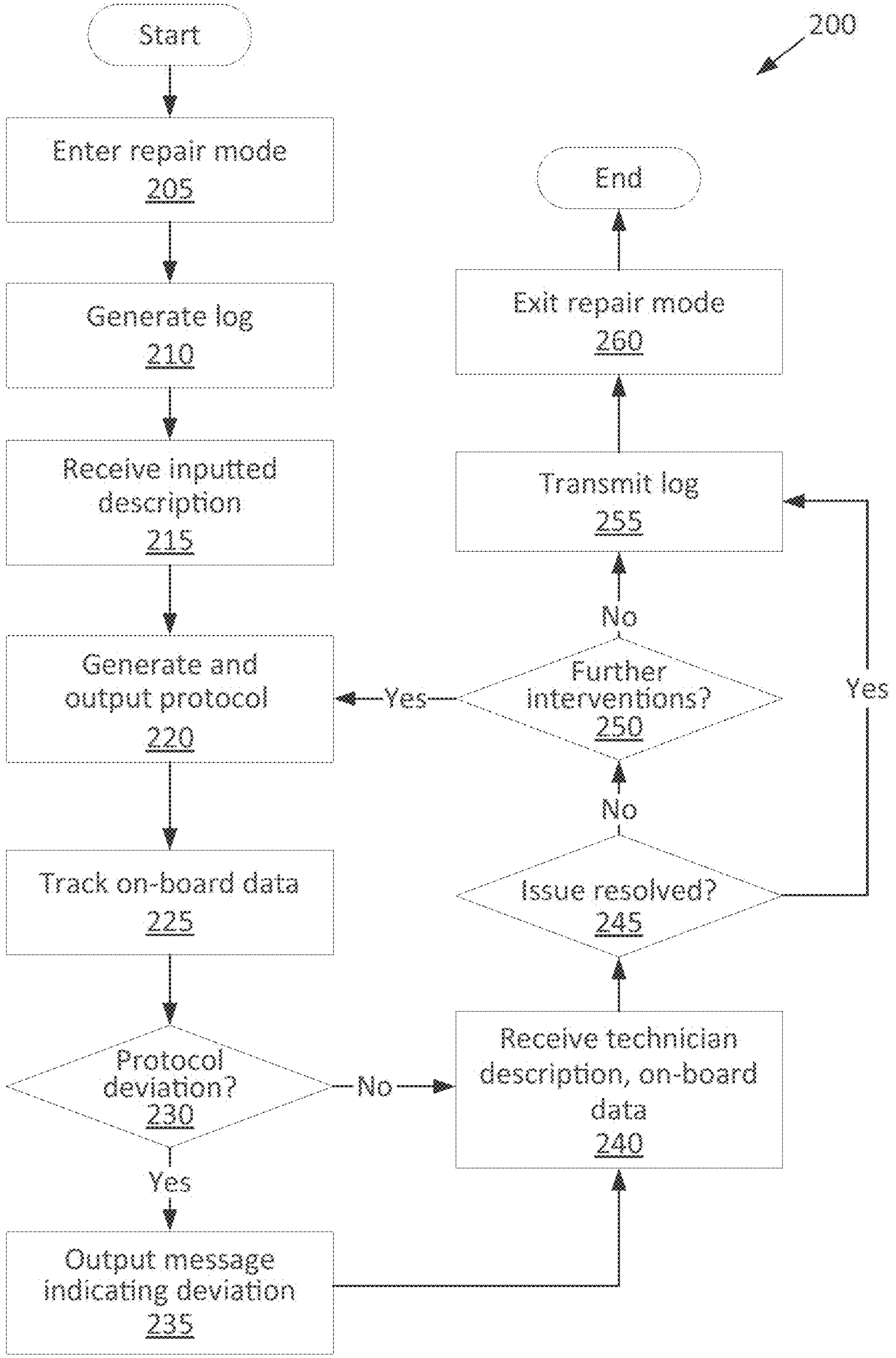
FIG. 2 is a flowchart of an example process for performing a repair of a malfunction on the vehicle.

FIG. 2 is a flowchart illustrating an example process 200 for performing a repair of a malfunction on the vehicle 100. The memory of the computer 105 stores executable instructions for performing the steps of the process 200, and/or programming can be implemented in structures such as mentioned above. As a general overview of the process 200, the computer 105 enters the repair mode, generates the log, receive the inputted description of the malfunction, and generates the protocol. For as long as the malfunction is unresolved and the protocol has proposed interventions that have not occurred, the computer 105 updates and outputs the protocol, tracks the data transmitted on board the vehicle 100, and, upon determining that the actual intervention deviated from the protocol, generates and displays an output indicating the deviation. Once the malfunction is resolved or all the proposed interventions in the protocol have occurred, the computer 105 transmits the message including the log to the remote server 135 and exits the repair mode.

The process 200 begins in a block 205, in which the computer 105 enters the repair mode, as described above.

Next, in a block 210, the computer 105 generates the empty log, as described above.

Next, in a block 215, the computer 105 receives the inputted description, as described above.

Next, in a block 220, the computer 105 generates and outputs the protocol for addressing the malfunction in the system 110, as described above.

Next, in a block 225, the computer 105 tracks the data transmitted on board the vehicle 100 indicating an actual intervention, as described above.

Next, in a decision block 230, the computer 105 determines whether the actual intervention indicated by the data from the block 225 deviated from the protocol, as described above. Upon determining that the actual intervention deviated from the protocol, the process 200 proceeds to a block 235. Upon determining that the actual intervention followed the protocol, the process 200 proceeds to a block 240.

In the block 235, the computer 105 generates an output indicating the deviation and displays the output indicating the deviation on the user interface 125, as described above. After the block 235, the computer 105 proceeds to the block 240.

In the block 240, the computer 105 updates the log with the data and the actual intervention from the block 225.

Next, in a decision block 245, the computer 105 determines whether the malfunction is resolved, as described above. In response to the malfunction being unresolved, the process 200 proceeds to a decision block 250. In response to the malfunction being resolved, the process 200 proceeds to a block 255.

In the decision block 250, the computer 105 determines whether the protocol includes any proposed interventions that have not yet occurred. In response to the protocol including at least one yet-to-be-tried proposed intervention, the process 200 returns to the block 220 to update the protocol. In response to all the proposed interventions occurring, the process 200 proceeds to the block 255.

In the block 255, the computer 105 transmits a message including the log to the remote server 135, as described above.

Next, in a block 260, the computer 105 exits the repair mode. After the block 260, the process 200 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions (e.g., from a memory, a computer readable medium, etc.) and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Use of "in response to," "upon determining," "upon receiving," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

generate a protocol to address a malfunction in a system of a vehicle based on an inputted description of the malfunction by executing a large-language model with a retrieval-augmented generator, the large-language model taking the inputted description as input and generating the protocol as output, the protocol including an ordered list of proposed interventions on the vehicle, the retrieval-augmented generator conforming the protocol to technical documentation about the vehicle, the protocol generated by the large-language model being an original creation compared with the technical documentation;

determine that a deviation occurred based on data transmitted on board the vehicle, the deviation being an actual intervention on the vehicle deviating from a respective one of the proposed interventions of the protocol, the data identifying at least one component of the system, the at least one component including an original electronic control module, the protocol including updating software on the original electronic control module before replacing the original electronic control module, the deviation being replacing the original electronic control module with a replacement electronic control module without updating the software on the original electronic control module; and upon determining that the actual intervention deviated from the protocol, generate an output indicating the deviation.

2. The computer of claim 1, wherein the data identifying the at least one component includes at least one identifying number of the at least one component.

3. The computer of claim 1, wherein the instructions to determine that the deviation occurred include instructions to determine that an identifier of the replacement electronic control module transmitted on board the vehicle is different than an identifier of the original electronic control module.

4. The computer of claim 1, wherein:

the protocol includes checking wired connections to the original electronic control module before replacing the original electronic control module.

5. The computer of claim 1, wherein the inputted description includes unstructured text.

6. The computer of claim 1, wherein the inputted description includes a diagnostic trouble code transmitted on board the vehicle.

7. The computer of claim 1, wherein the large-language model is trained on training data including service manuals.

8. The computer of claim 1, wherein the large-language model is trained on training data including descriptions of earlier malfunctions.

9. The computer of claim 1, wherein the instructions further include instructions to display the output indicating the deviation on a user interface of the vehicle.

10. The computer of claim 1, wherein the instructions further include instructions to, upon determining that the actual intervention deviated from the protocol, transmit a message indicating the deviation to a server remote from the vehicle.

11. The computer of claim 10, wherein the message includes a log of actual interventions on the vehicle.

12. A method comprising:

generating a protocol to address a malfunction in a system of a vehicle based on an inputted description of the malfunction by executing a large-language model with a retrieval-augmented generator, the large-language model taking the inputted description as input and generating the protocol as output, the protocol including an ordered list of proposed interventions on the vehicle, the retrieval-augmented generator conforming the protocol to technical documentation about the vehicle, the protocol generated by the large-language model being an original creation compared with the technical documentation;

determining that a deviation occurred based on data transmitted on board the vehicle, the deviation being an actual intervention on the vehicle deviating from a respective one of the proposed interventions of the protocol, the data identifying at least one component of the system, the at least one component including an original electronic control module, the protocol including updating software on the original electronic control module before replacing the original electronic control module, the deviation being replacing the original electronic control module with a replacement electronic control module without updating the software on the original electronic control module; and upon determining that the actual intervention deviated from the protocol, generating an output indicating the deviation.

13. The method of claim 12, wherein the data identifying the at least one component includes at least one of a part number or serial number of the at least one component.

14. The method of claim 12, wherein determining that the deviation occurred includes determining that an identifier of the replacement electronic control module transmitted on board the vehicle is different than an identifier of the original electronic control module.

* * * * *